United States Patent [19]

Forbes et al.

[11] 4,373,668
[45] Feb. 15, 1983

[54] SPREADER CONTROL

[76] Inventors: Donald R. Forbes, Rte. 107,
Raymond Rd., Deerfield, N.H.
03037; Edson A. Forbes, 12 D'Angelo
Rd., Wayland, Mass. 01778

[21] Appl. No.: 156,925

[22] Filed: Jun. 6, 1980

[51] Int. Cl.³ .............................................. A01C 17/00
[52] U.S. Cl. .................................... 239/74; 239/155;
239/670; 239/677; 239/684
[58] Field of Search ................ 222/626; 239/155, 156,
239/670, 672, 673, 675, 677, 684, 70, 71, 74

[56] References Cited

U.S. PATENT DOCUMENTS 4,052,003 10/1977 Steffen ............................ 239/155 X
4,132,941 1/1979 Sousek et al. .................... 239/155 X

FOREIGN PATENT DOCUMENTS 2843487 4/1980 Fed. Rep. of Germany ...... 239/675

Primary Examiner—Andres Kashnikow

Attorney, Agent, or Firm—Wolf, Greenfield & Sacks

[57] ABSTRACT

A computer control technique controls a chemical spreading operation such as the spreading of a salt-sand composition from a truck hopper. The vehicle has a spinner motor controlled by the vehicle operator from the control panel which is preferably disposed in the vehicle cab, and a conveyor motor operated under computer control and operator control. A display is part of the control panel and indicates conveyor motor speed to the operator. The operating power for the system, and in particular the conveyor motor, is derived from an AC generator (alternator) preferably driven from the fan belt drive of the vehicle motor thus not requiring any separate motor drive or hydraulic drive. In one embodiment a single alternator is used for both conveyor motor power and normal electrical vehicle power, while in an alternative embodiment separate alternators are employed both associated with the vehicle motor.

10 Claims, 6 Drawing Figures

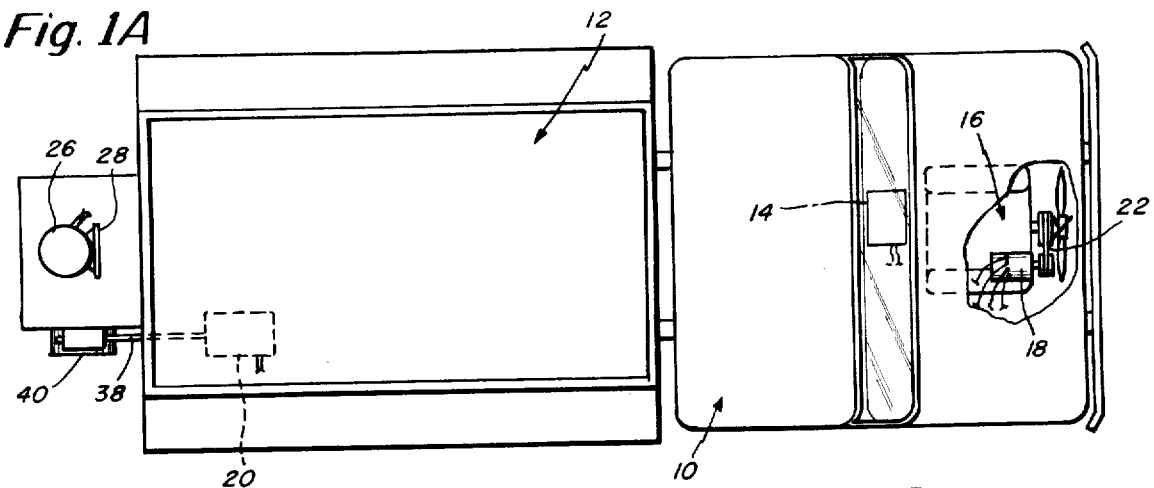
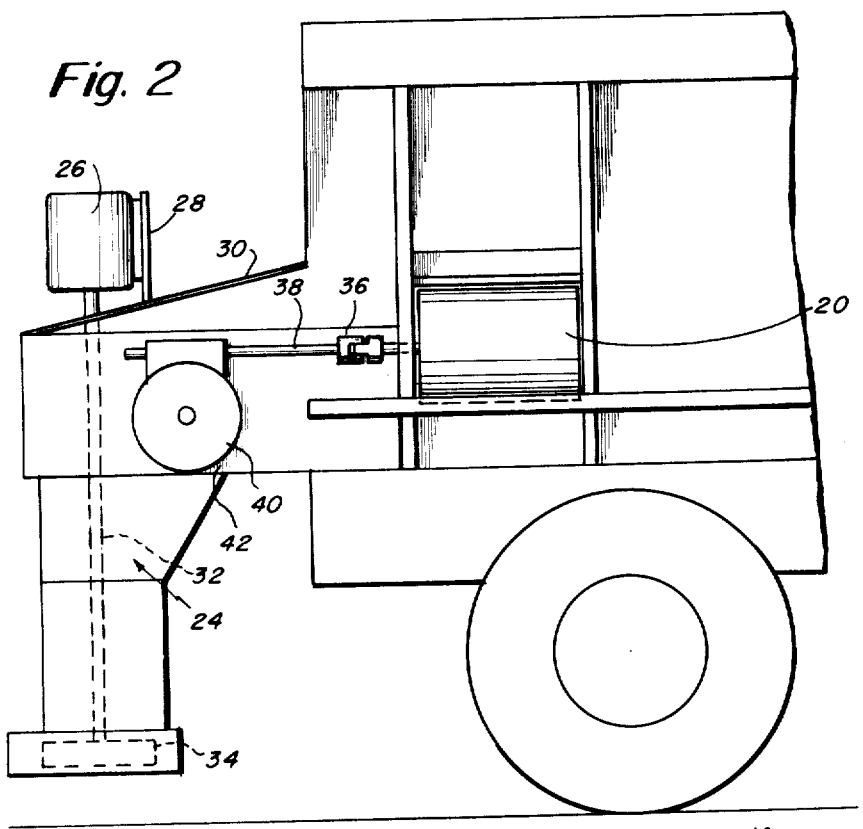
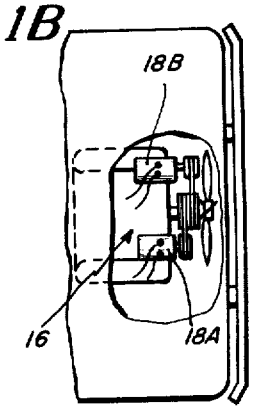
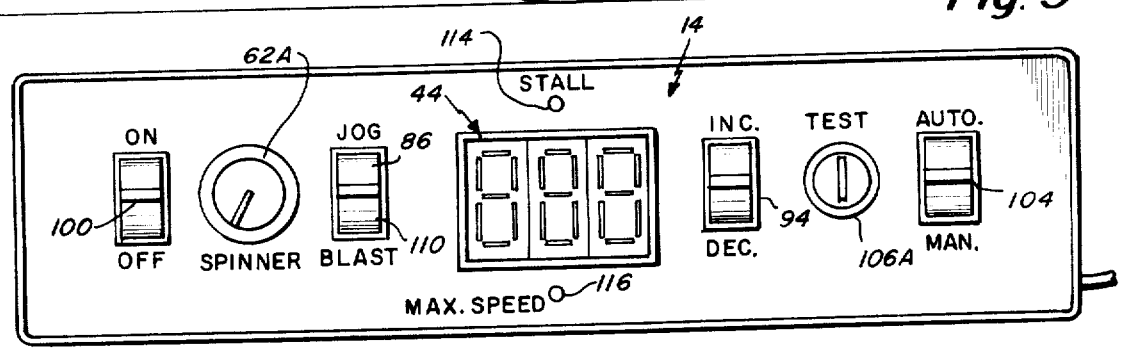

SPREADER CONTROL

BACKGROUND OF THE INVENTION

The present invention relates to a spreader control system for a vhicle for controlling the spreading of a product from the vehicle. The control in accordance with the present invention is preferably used with a truck that spreads salt, sand or other chemicals as the vehicle moves. The vehicle typically includes a hopper having a conveyor for conveying sand, salt or the like to a spreader.

The prior art patents that show spreader apparatus include U.S. Pat. Nos. 3,113,784; 3,344,993; 3,395,866; and 3,792,709. Some of these systems are essentially totally hydraulic. See for example, U.S. Pat. No. 3,113,784 which shows a material spreader operated by a hydraulic motor and also disclosing a ground speed control system that is operated hydraulically. The U.S. Pat. No. 3,344,933 also shows a system that is at least partially hydraulic showing a hydraulic motor for driving the material discharge means. Other systems such as shown in U.S. Pat. No. 3,395,866 employ a separate internal combustion engine that may be used to drive both the conveyor (auger) and the spreader spinner.

One object of the present invention is to provide an improved spreader control system and one in particular that does not require hydraulic drives and associated hydraulic controls. Such hydraulic systems often require maintenance.

Another object of the present invention is to provide a speed control system for a vehicle having a conveyor means wherein the control system is essentially entirely electrically operated and controlled.

A further object of the present invention is to provide a spreader control system for a motor vehicle having a conveyor means preferably in the form of a conveyor motor that is powered from an alternator of the like driven from the motor of the vehicle. Moreover, in accordance with the present invention the spinner is operated from an electric spinner or speader motor which is preferably operated under manual control.

Another object of the present invention is to provide an improved spreader control system wherein the control permits ease of operation by the operator of the vehicle to control conveyor motor speed.

A further object of the present invention is to provide an improved spreader control system that can be operated either in an automatic or a manual mode of operation. In the manual mode of operation, material or product is discharged in accordance with a value set by the operator. In the automatic mode of operation the discharge of material or products is also a function of the vehicle speed.

Still a further object of the present invention is to provide a spreader control system for a motor vehicle having a conveyor means which incorporates both a jog feature and a blast feature. The jog operation under manual control momentarily reverses the conveyor motor to loosen compacted material and free conveyor movement. The blast operation also under manual control provides for a temporary increase in conveyor speed for providing momentarily heavy spreading rates.

Still another object of the present invention is to provide an improved spreader control system for a motor vehicle having a conveyor means including a control panel in the driving compartment of the vehicle including a display for conveyor motor speed so that the operator is continuously aware of the conveyor motor speed.

SUMMARY OF THE INVENTION

To accomplish the foregoing and other objects of this invention there is provided a spreader control system that is for use with a motor vehicle such as a sand truck used for spreading sand, salt and the like on winter roads. Such a motor vehicle is typically provided with a conveyor means for the product that is being discharged. The conveyor means directs such products as sand, salt or other chemicals, to a spreader or spinner from which the products if finally discharged. In accordance with the invention the system comprises an electrical spreader motor, means for mounting the spreader motor at a rear of the vehicle adjacent the conveyor means, an electrical conveyor motor, and means for mounting the electrical conveyor motor for driving the conveyor means, and a second control means for controlling the electrical conveyor motor. The power for the conveyor motor is derived from alternator power means which is operated from the vehicle motor and including means for controlling the alternator power means output to the electrical conveyor motor. This control means preferably comprises a computer control means including means for sensing conveyor motor speed, means for sensing vehicle speed, and means responsive to both conveyor motor and vehicle speed signals to control the output from the computer which in turn controls such functions as conveyor motor speed.

With regard to the computer control in accordance with this invention there are a number of control parameters. The majority of these features are controlled from a control panel that is disposed preferably in the driving compartment of the vehicle. These controls include an on-off control for applying power to the conveyor motor drive system and an increment/decrement control enables the operator to increase and decrease conveyor motor speed under manual control. In this connection there is also provided a display which continuously shows conveyor motor speed. Another control that is provided at the control panel is an alternate control for either automatic or manual operation. In the manual mode of operation material or the product is discharged in accordance with a value set in the readout. In the automatic mode of operation, this discharge occurs in accordance with, not only the values set in the display, but also in accordance with vehicle speed and thus, in the manual mode of operation the readout actually displays revolutions of conveyor shaft per minute whereas in the automatic mode of operation the readout displays revolutions of conveyor shaft per mile. There is also another manual/automatic feature that can be controlled. In the manual mode, there is full operator access to all control parameters such as the increment/decrement control. In the automatic mode of operation there is no operator access to these control parameters and the operator spreads the product at the set automatic rate controlling only the on and off mode.

The control in accordance with this invention is also, the control for the spreader motor speed. This control is preferably a manual control that occurs at the control panel. The spreader motor speed is preferably settable independent of conveyor motor speed or vehicle speed.

BRIEF DESCRIPTION OF THE DRAWINGS

Numerous other objects, features and advantages of the invention should now become apparent upon a reading of the following detailed description, taken in conjunction with the accompanying drawings, in which:

FIG. 1A is a plan view of a motor vehicle embodying the spreader control system of this invention;

FIG. 1B is a fragmentary view showing a portion of the vehicle of FIG. 1A and an alternate form of the system;

FIG. 2 is a side elevation view at the rear of the vehicle showing some of the components of the system;

FIG. 3 shows the control panel in the driving compartment as depicted by the block in FIG. 1A.

DETAILED DESCRIPTION

Figure 4A:
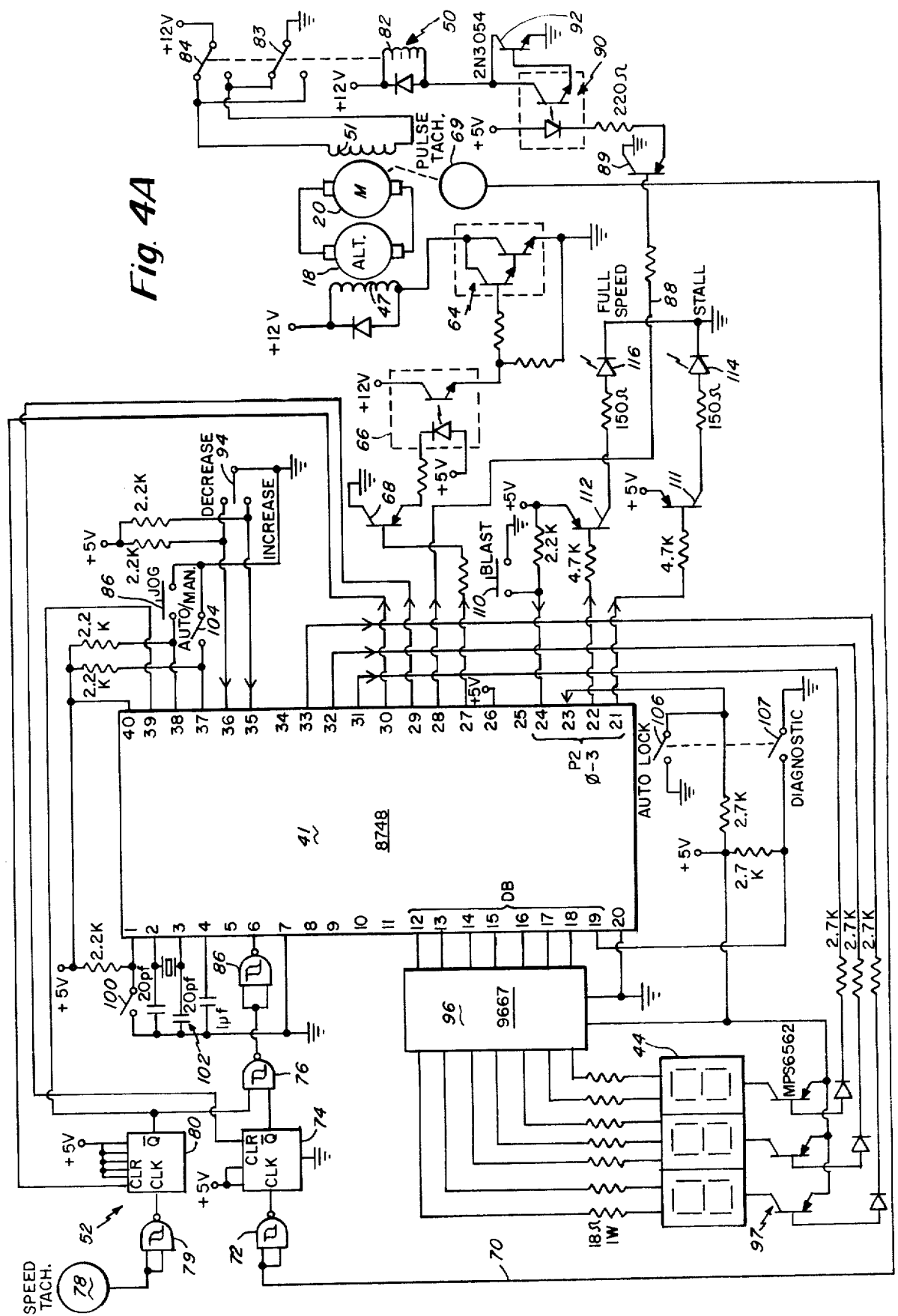
FIGS. 4A and 4B show the circuitry that forms the system control in accordance with the invention including the main controller computer.
Figure 4B:
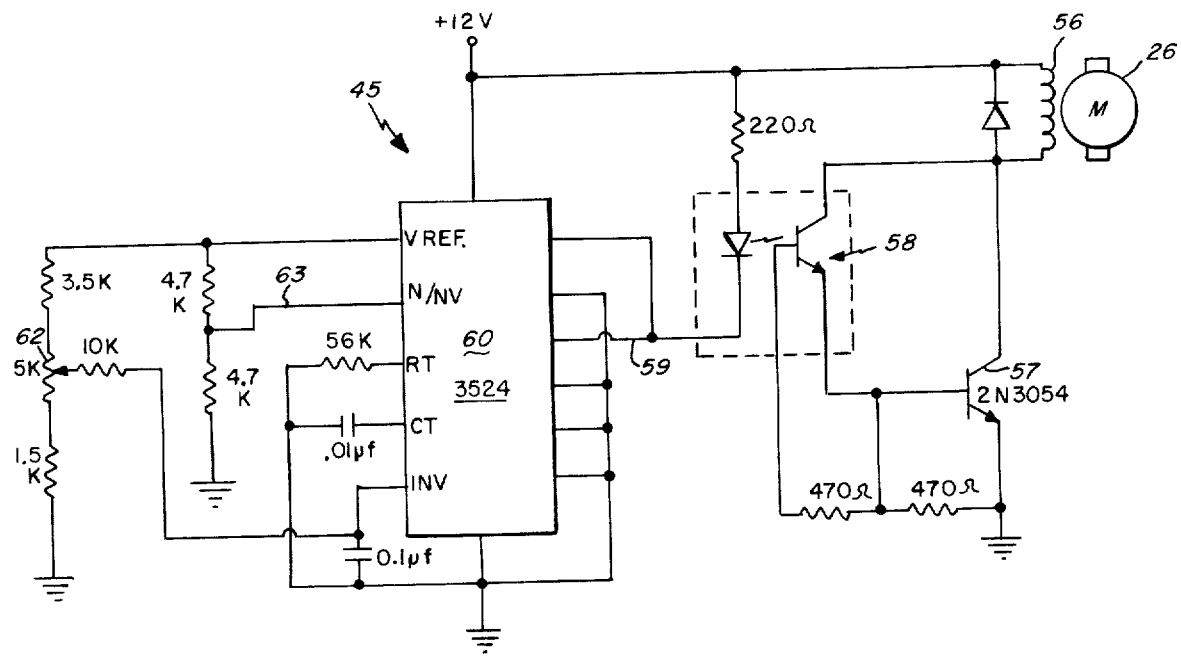

Referring to the drawings, FIG. 1A shows a plan view of the motor vehicle embodying the spreader control system of this invention. FIG. 1B shows a fragmentary view showing a portion of the vehicle of FIG. 1A and an alternate form of the system. FIG. 2 shows a side elevation view at the rear of the vehicle showing some of the components of the system. FIG. 3 shows the control panel in the driving compartment as depicted by the block in FIG. 1A. FIGS. 4A and 4B show the circuitry that forms the system control in accordance with the invention including the main controller computer.

One of the purposes of the present invention is to provide a system that is essentially totally electric, not having any requirements for the use of hydraulic devices or hydraulic controls. The heart of the control system of this invention is a computer 41 which is depicted in FIG. 4A. In the illustrated embodiment this computer is an Intel computer No. 8748. It is to the computer that all manual controls connect and from which the display signals are coupled to provide display of conveyor motor speed.

FIG. 1A shows a motor vehicle in the form of a sand truck including a cab 10 and a rear hopper 12 in which the sand, salt, or other chemical product is retained. A control panel 14 is shown as a box in FIG. 1A and is preferably in the driving compartment of the vehicle mounted to the dash of the vehicle or in any other convenient location to the driver or operator of the vehicle. FIG. 1A depicts some wiring coupling from the box 14, however, the details of the entire circuitry and control is discussed and shown in more detail hereinafter with regard to FIGS. 4A and 4B. Forward of the driving compartment is the engine compartment where there is mounted an internal combustion engine or motor 16 having mounted therefrom, in the embodiment of FIG. 1A, a dual alternator 18 having two pairs of leads extending therefrom. One pair of leads provide the normal electrical power for the vehicle and the other pair of leads lead to the conveyor motor 20. The dual alternator 18 is shown driven from the vehicle fan belt 22. FIG. 1B shows the alternate arrangement wherein two separate alternators 18A and 18B are employed, both driven from respective fan belts associated with the motor 16. One of the alternators is used for the normal power used in the vehicle and the other alternator, such as alternator 18B couples its electrical power to the conveyor motor 20.

FIGS. 1A and 2 also depict the rear of the hopper 12 including a discharge chute 24. Above the chute 24 is mounted the spinner or spreader motor 26, which may be mounted from the mounting plate 28 which is in turn fastened from the wall 30 forming a portion of the chute apparatus. The spinner motor 26 has a relatively long shaft 32 terminating at its bottom end in a fan-like spinner or spreader that spreads the product taken from the hopper in a relatively uniform manner on the roadway. While the uniformity of the spreading is controlled by the motor 26, the amount of material that is discharged is controlled primarily by the conveyor motor 20. Motor 20 couples by means of a joint 36 to shaft 38 which then controls a gear arrangement, the details of which are not shown in FIG. 2. This arrangement drives a conveyor means in the form of a cylinder 40 mounted over the chute 24 and leaving a restricted passage 42 for the passage of the product that is being discharged into the chute 24.

In accordance with the present invention the spinner motor 26 is controlled at the control panel 14, the details of which are shown in FIG. 3. Thus, the spreader motor 26 is preferably set at a given value and substantially left at that value during a spreading operation. The conveyor motor 20, on the other hand, may be controlled either in a manual mode of operation or an automatic mode of operation and either case maintains a constant conveyor motor speed regardless of the speed of the vehicle engine. Furthermore, in the automatic mode of operation the conveyor motor speed is also tied to vehicle speed. Also included in FIG. 3 is a three digit display 44 and various switches the function of which will be discussed in more detail hereinafter with references to FIGS. 4A and 4B.

In FIGS. 4A and 4B there is shown the spinner or spreader motor 26 and associated control 45, alternator 18, conveyor motor 20, conveyor motor control 50, ground speed reference logic 52, display 44, and various switches and associated components for providing control in accordance with the features of this invention. Again, the heart of the invention as far as control is concerned may be considered to be the computer 41. As mentioned previously, this computer in the disclosed embodiment is an Intel No. 8748 with the terminals as identified in FIG. 4A. This device is an 8-bit parallel computer fabricated on a single silicon chip using N-channel silicon gate MOS process. This microprocessor is designed to be an efficient controller as well as an arithmetic processor.

The spinner or spreader motor 26 has associated therewith a field winding 56 which is driven from transistor 57 and the opto-coupler 58. The opto-coupler 58 is a conventional device typically including a light emitting diode and associated phototransistor as shown in FIG. 4B. The input to the opto-coupler 58 is from the output line 59 of device 60. Device 60 may be a pulse width modulator such as the device 3524 having an output on line 59, the frequency and duty cycle of which is dependent upon input settings to the modulator or oscillator 60. The basic control for the output from the device 60 is by way of the potentiometer 62. The input line 63 establishes a reference voltage from a voltage divider, which reference voltage is used for the device 60. The potentiometer 62 has a manual control 62A shown in the control panel of FIG. 3 that is easily accessible to the operator of the vehicle. This control may be set by the operator so that the spinner motor 26 operates at some predetermined speed. The pulsed output on line 59 from device 60 is coupled by way of the opto-coupler 58 and the amplifying transistor 57 to the field winding 56 whch is excited at a particular frequency for driving the AC motor 26.

The alternating power from the alternator 18 in either of the two embodiments disclosed couples, as shown in FIG. 4A, to the conveyor motor 20. The mounting for the alternator in either embodiment may be conventional. The alternator is controlled by way of the field winding 47, which is in turn controlled from the Darlington device 64, and the opto-coupler 66. The circuit can be further traced to the output pin 27 of computer 41. There is provided an output signal from pin 27 of the device 41 coupled by way of transistor 68, the opto-coupler 66 and the circuit 64 to the field winding 47 for controlling the output voltage from the alternator 18. The signal at output pin 27 from the computer is a signal that is a function of a number of control parameters discussed in detail hereinafter. Such parameters include vehicle speed and sensed conveyor motor speed. The output frequency of the signal on the pin 27 is controlled by the computer to operate the alternator at the desired output signal to maintain a desired conveyor motor speed in either an automatic or manual mode of operation. In this connection it is noted that there is provided a pulse tachometer 69 which may be of conventional design and which senses the speed of the conveyor motor 20.

The pulse tachometer 69 is shown in FIG. 4A as coupling by way of line 70 to the ground speed reference logic 52, and in particular to the Schmitt trigger device 72, which in turn couples to flip-flop 74. The output from the flip-flop 74 is anded by means of the AND gate 76, with the vehicle reference speed from the speedometer tachometer 78. The output from the speedometer tachometer 78 couples to trigger device 79 which in turn couples to a second flip-flop 80. The summed signal from device 76 couples by way of inverter 86 to the input pin 6 of the computer 41. When the switch 104 is in the automatic position, then the control signal at pin 6 is instrumental in determining the signal on the output pin 27 for controlling the conveyor motor. In this arrangement, the reference logic 52 may also be provided in a different form with the basic arrangement being to essentially mix or add the tachometer signal from device 69 and the speedometer tachometer signal. The ground speed reference logic operates so that when the speedometer signal increases above the existing conveyor motor speed, the computer 41 interprets this signal to in turn increase the conveyor motor speed so that essentially in this automatic mode of operation the revolutions of conveyor shaft per mile is maintained substantially constant. Alternatively, when the speedometer signal decreases the alternate occurs with the feedback providing a decrease in conveyor motor speed.

In FIG. 4A there is also shown control circuitry 50 associated with the field winding 51 of the conveyor motor 20. The field winding 51 is basically held in one of two polarity positions. In this connection the control circuitry 50 includes a relay 82 having associated therewith contacts 83 and 84. In the position depicted in the drawings, the contacts supply a first polarity signal to the field winding 51 with a positive voltage being applied to the top end of the field winding, causing the conveyor motor 20 to operate in a forward direction which is the normal direction of operation. When the relay 82 is energized, then the contacts 83 and 84 move to their opposite position thus reversing the voltage on the field winding 51 causing reverse operation of the conveyor motor. In this instance then the positive voltage is applied to the bottom of the field winding 51. The relay coil 82 is operated from circuitry including transistors 89 and 92, from line 88 which couples from the output pin 28 of the computer 41. The output signal at pin 28 is determined at least in part by the input signal on pin 38 associated with the jog switch 86.

When the jog switch 80 is momentarily operated, a signal is coupled to the input pin 38 of the computer thus signalling the computer for a jog operation. This is desired when the conveyor motor becomes clogged with compacted material. When this occurs it is desirable to provide at least a momentary reversal of the conveyor motor to free any compacted material and permit conveyor motor operation subsequently in a forward direction. Thus, when the jog switch 86 is activated, there is an output signal on the pin 28 from the computer coupled by way of line 88 and the transistor 89 to the opto-coupler 90. When this occurs the output transistor 92 is driven into conduction and the relay 82 latches. This operation causes a reversal of the polarity as described hereinbefore and creates reverse operation of the conveyor motor 20. Because the jog operation is a momentary one, as soon as the jog switch 86 is released, then the signal on line 88 reverts to its inactive high level causing the relay 82 to unlatch, thus reverting the contacts 83 and 84 back to their original polarity position for forward operation of the conveyor motor 20.

The display 44 is shown in FIG. 3 and is also shown in the electrical schematic of FIG. 4A. The display 44 is a three digit display with each digit being of conventional 7 segment form. In fact, the display 44 along with the driver 96 and the output transistor array 97 may all be of conventional design. This display is for indicating a reading of revolutions of the conveyor motor shaft. In one mode of operation, namely the manual mode, the indication is of revolutions of conveyor shaft per minute. On the other hand, in the automatic mode, the display indicates revolutions of conveyor shaft per mile. The output pins 12–18 from the computer 41 couple to 7 inputs of the device 96. These outputs then couple to the display device 44. These 7 signals represent the 7 segments of each character and the transistor array 97 has one of its transistors selected to select which character is being displayed. The display is thus controlled on a multiplexing basis.

At initial start-up of the system the display may be at a zero count with the switch 94 being usable in its "increase" state to increase conveyor motor speed with the operator at all times having the capability of observing the display 44 until the proper reading is reached. If at a subsequent time the operator prefers to lower the rate, then the switch 94 can be operated to the decrease position.

As mentioned previously, the computer 41 has 7 output lines identified as data lines 12–18 which couple to the 7 segment driver 96 which may be a 9667 device. The output from the driver couples all 7 lines to the 7 segment inputs of the display. Because there are a total of 3 digits that are being displayed, there are also 3 additional inputs to the display by way of transistor array 97 from lines 31, 32 and 33 of the computer 41. The output signals on these lines are timed so that the transistors of array 97 are conductive in sequence to essentially address one of the digits at a time. This is a typical arrangement in association with the computer 41 for driving a display therefrom.

FIG. 4A also shows an on-off switch 100, also shown in FIG. 3 which has one side coupled to the input pin 1 of the computer 41. This switch may also have other contacts not shown in the drawing for coupling and uncoupling power to various other components of the system. When this switch is closed and power is applied, there is caused to be operation of the oscillator 102 which provides an input reference frequency or master clock frequency for the computer circuit 41. The oscillator 102 may be of conventional design and is shown as including a network of capacitors and a crystal.

As mentioned previously, one of the other control switches is the increment-decrement switch 94 which is also shown in the control panel of FIG. 3. In the increment position of this switch there is a signal, which is a ground signal coupled to the input pin 35 of the computer while in the decrement position this same signal is coupled instead to the input pin 36 of the computer. This is a momentary switch that returns automatically to a middle position as depicted in FIG. 4A. This switch is used to control the computer 41 to either increment or decrement the readout value from the display 44 which, of course, corresponds with an increment or decrement of the signal on line 27 to control the conveyor motor 20. The circuitry is arranged so that momentary toggling of the switch 94 causes the value in the readout to change by one digit while maintaining the switch in either position causes a rapid change of the display until the desired value is reached at which time the switch is then released. In this way the operator can hone in on the desired operating speed for the conveyor motor.

In FIG. 4A there is also shown the automatic/manual switch 104 which is essentially connected in parallel with the jog switch 86. Switch 104 is maintained either in an open position, as shown in FIG. 4A, or in a closed position coupling the ground signal to pin 37. In the open position the switch is, of course, not coupling any signal to the input pin 37 of the computer. In the manual mode of operation the material is discharged by the conveyor motor in accordance with a value set in the display 44. Thus, in this mode of operation the readout displays in revolutions of conveyor shaft per minute. Because the operator continuously has a display of this magnitude, then it is only a case of operating the switch 94 to either increment or decrement from the observed reading. Thus, in the manual mode of operation the control of the conveyor motor is solely a function of the reading arrived at by operating this switch 94 to alter the conveyor motor speed and the corresponding display on the display 44.

On the other hand, in the automatic mode of operation as set by the switch 104 then the information that is coupled to the computer 41 at its input pin 6 is used to control the output signal on pin 27 to in turn control the conveyor motor via the alternator field. In this mode of operation the discharge of the material is effected by the vehicle speed so that the display shows revolutions of conveyor shaft per mile. Thus, at a fixed value in the automatic mode of operation if the vehicle changes speed, the number of revolutions of the conveyor shaft per distance stays the same there is thus a decrease in conveyor motor speed when the vehicle speed decreases and vice versa.

FIG. 4A shows other control that is also used such as switches 106 and 107 which actually are ganged switches. Actually, this is preferably a key lock switch. In accordance with this feature, the switch 106 controls automatic operation wherein a ground input signal is coupled by way of the switch 106 to the input pin 23 of computer 41. In this mode of operation there is no operator access to the control parameters. The operator must spread the product at the set automatic rate, controlling only the on/off switch 100. Thus, in this automatic operation position the operator does not have any control over such variables as switch 94 or switch 104. In the manual mode of operation both switches 106 and 107 are open and there is allowed full operator access to the control parameters so that switch 104 can be operated to either its automatic or manual position. Thus, the switches 106 and 107 which operate together are related to switch 104. In the diagnostic position there is a ground signal applied to the input pin 19 of the computer. In this mode of operation the operator of the vehicle or a maintenance person can perform computer aided system diagnostics for fault finding. In this regard also note the switch 106A in FIG. 3 which is the key lock switch having essentially three different positions for operating the switches 106 and 107 in three different combinations as previously discussed.

Reference has been made hereinbefore to the jog operation employing the switch 86 for providing momentary reversal of the conveyor motor. In this regard there is also provided a blast switch 110 which, when operated, momentarily couples a ground signal into the pin 24 of the computer. As long as the switch 110 is depressed there is provided a 50% increase in conveyor speed for momentarily providing heavy spreading rates. Thus, the signal on the input pin 24 through the computer control, provides an output signal on pin 27 which signals a 50% increase in operating speed of the conveyor motor, coupled to the field winding 47.

FIG. 4A also shows two other output signals on pins 21 and 22 from the computer 41 which couple respectively to drive transistors 111 and 112. The output from transistor 111 couples to a light emitting diode 114 while the output of the other drive transistor 112 couples to a second light emitting diode 116. These are indicator diodes. The diode 114 is used as an indicator for a stall condition while the diode 116 indicates a full speed condition. The stall signal from pin 21 of the computer is generated when there is a readout on the display 44 with yet the sensed speed from tachometer 69 being essentially zero. This indicates a stall condition sensed by the computer and activating the indicator 114. This indicator is also shown in FIG. 3. When this condition occurs, it is immediately observed by the operator of the vehicle by indicating to him the stall condition. Also, when there is a full speed signal detected by way of the tachometer 69, the computer also senses this and causes an illumination of the indicator 116, which is also shown in the control panel of FIG. 3.

Having described one preferred embodiment of the present invention, it should now be apparent to those skilled in the art that numerous other embodiments are contemplated as falling within the scope of this invention. For example, the concepts of this invention have been described in association with a sand truck or the like. However, the computer-type control may also be used in association with other load devices. For example, the control could be for a motor other than for a conveyor motor.

What is claimed is:

1. Spreader control system for a vehicle having an internal combustion engine and a conveyor means for a product that is to be spread leading to a spreader, said system comprising;
   electrical spreader motor,
   means for mounting the spreader motor at a rear of the vehicle adjacent the conveyor means for operating the vehicle spreader,
   electrical conveyor motor,
   means for mounting the conveyor motor for driving the conveyor motor,
   first control means including means for controlling the electrical spreader motor comprising manually settable adjustment means for controlling spreader motor speed independent of conveyor motor speed,
   and second control means for controlling the electrical conveyor motor, including alternator power means operated from the vehicle internal combustion engine and means for controlling the alternator power means output to the electrical conveyor motor,
   wherein said second control means includes a computer, mode control means having a manual position and an automatic position, means coupling the mode control means to the computer, said computer having a control output line, means coupling the computer output line to a control winding of the alternator power means, said mode control means in its manual position providing a preset frequency signal for controlling the conveyor motor at a set revolution per time, means for sensing vehicle speed, said mode control means in its automatic position providing a control signal to the conveyor motor to operate the conveyor motor as a speed which is a function of both a preset signal and the vehicle speed signal.

2. Spreader control system as set forth in claim 1 wherein said first control means includes pulse means, the frequency of which is manually controlled.

3. Spreader control system as set forth in claim 1 wherein said alternator power means provides power for the conveyor motor and also for other electrical functions in the vehicle.

4. Spreader control system as set forth in claim 1 wherein said alternator power means provides power for the conveyor motor and a second alternator means is used for other electrical functions in the vehicle.

5. Spreader control system as set forth in claim 1 including means for sensing conveyor motor speed and means responsive to both conveyor motor and vehicle speed signals to control said computer.

6. Spreader control system as set forth in claim 1 including display means coupled from the computer for indicating conveyor motor speed.

7. Spreader control system as set forth in claim 6 wherein said mode control means coupled to said computer in one position causes the display to be in revolutions per time and in another position causes the display to be in revolutions per distance.

8. Spreader control system as set forth in claim 1 including display means and means coupling the display means to the computer, said computer including means operable in the manual mode for providing a display in revolutions per time, and in the automatic mode for providing a display in revolutions per distance.

9. Spreader control system as set forth in claim 8 incuding tachometer means responsive to conveyor motor speed and ground reference circuitry responsive to the conveyor motor speed and vehicle speed to provide an automatic control signal to the computer.

10. Spreader control system as set forth in claim 9 including manual increase/decrease speed switch means coupled to the computer for controlling conveyor motor speed comprising a momentary switch having two momentary positions corresponding to respective speed increase and decrease, and an inactive rest position.

* * * * *